United States Patent
Krylov et al.

(10) Patent No.: US 10,867,038 B2
(45) Date of Patent: Dec. 15, 2020

(54) SYSTEM AND METHOD OF DETECTING MALICIOUS FILES WITH THE USE OF ELEMENTS OF STATIC ANALYSIS

(71) Applicant: AO Kaspersky Lab, Moscow (RU)

(72) Inventors: Vladimir V. Krylov, Moscow (RU); Alexander V. Liskin, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 295 days.

(21) Appl. No.: 15/669,094

(22) Filed: Aug. 4, 2017

(65) Prior Publication Data

US 2018/0365420 A1     Dec. 20, 2018

(30) Foreign Application Priority Data

Jun. 16, 2017   (RU) .................................. 2017121123

(51) Int. Cl.
| | |
|---|---|
| *H04L 9/00* | (2006.01) |
| *G06F 21/56* | (2013.01) |
| *H04L 29/06* | (2006.01) |
| *G06F 16/00* | (2019.01) |

(52) U.S. Cl.
CPC ............ *G06F 21/563* (2013.01); *G06F 16/00* (2019.01); *H04L 63/1408* (2013.01)

(58) Field of Classification Search
USPC ........................................................ 726/24
See application file for complete search history.

(56) References Cited

U.S. PATENT DOCUMENTS

| | | | | |
|---|---|---|---|---|
| 9,003,314 | B2* | 4/2015 | Hinchliffe | G06F 21/50 |
| | | | | 715/762 |
| 9,946,876 | B2* | 4/2018 | Wojnowicz | G06F 21/565 |
| 10,025,929 | B2* | 7/2018 | Sethumadhavan | H04L 9/3239 |
| 2008/0263669 | A1* | 10/2008 | Alme | G06F 21/56 |
| | | | | 726/24 |
| 2014/0020094 | A1 | 1/2014 | Wang et al. | |
| 2014/0366137 | A1 | 11/2014 | Tatarinov | |
| 2017/0262633 | A1* | 9/2017 | Miserendino | G06F 21/564 |

FOREIGN PATENT DOCUMENTS

GB            2506605 A        4/2014

OTHER PUBLICATIONS

Tencon '97 Brisbane—Australia. Proceedings of IEEE TENCON '97. IEEE Region 10 Annual Conference. Speech and Image Technologies for Computing and Telecommunications (Cat. No. 97CH36162) (Year: 1997).*

* cited by examiner

*Primary Examiner* — Christopher J Brown
(74) *Attorney, Agent, or Firm* — Arent Fox LLP; Michael Fainberg (57) ABSTRACT

A system and method is provided for determining whether an electronic file is malicious. An exemplary method includes extracting resources from an electronic file; forming a first rule that establishes a functional dependency between the extracted resources; identifying, in a database of malicious file resources, a second rule associated with one or more of the extracted resources; comparing the formed first rule with the identified second rule to calculate a degree of similarity between first and second rules; and determining the electronic file to be a malicious file when the calculated degree of similarity exceeds a predetermined threshold value.

20 Claims, 3 Drawing Sheets

SYSTEM AND METHOD OF DETECTING MALICIOUS FILES WITH THE USE OF ELEMENTS OF STATIC ANALYSIS

CROSS-REFERENCE TO RELATED APPLICATIONS

This application claims benefit of priority under 35 U.S.C. 119(a)-(d) to a Russian Application No. 2017121123 filed on Jun. 16, 2017, which is incorporated by reference herein.

FIELD OF TECHNOLOGY

The disclosure relates generally to antivirus technologies and, more specifically, to systems and methods of detecting malicious files with the use of elements of static analysis.

BACKGROUND

The rapid development of computer technologies in the recent decade, as well as the widespread use of various computing devices (personal computers, notebooks, tablets, smartphones, etc.), have become a powerful incentive to use these devices in various areas of activity and to solve a huge number of problems (from Internet surfing to bank transfers and electronic documentation). In parallel with the growth in the number of computing devices and software running on these devices, the number of malicious programs has also grown at a rapid pace.

At present, a huge number of kinds of malicious programs exist. Some of them steal personal and confidential information from the devices of users (such as logins and passwords, banking information, electronic documents). Others turn the devices of users into so-called botnets for attacks such as distributed denial of service (DDOS) attacks, or to sort through passwords by the brute force method on other computers or computer networks. Still others offer paid content to users through intrusive advertising, paid subscriptions, sending of SMSs to toll numbers, and so on.

Specialized, or antivirus, programs are used to deal with malicious programs, including the detecting of malicious programs, the preventing of infection and the restoring of computer systems infected with malicious programs.

Antivirus programs employ diverse technologies to detect a whole array of malicious programs, such as:
  static analysis—the analysis of a program for harmfulness, including launching or emulation of the working of the program being analyzed, on the basis of data contained in files making up the program being analyzed, during which statistical analysis may employ:
  signature analysis—searching for correspondences of a particular code section of a program being analyzed to a known code (signature) from a database of signatures of malicious programs;
  white and black lists—searching for a computed check sum from a program being analyzed (or portions thereof) in a database of check sums of malicious programs (black lists) or a database of check sums of secure programs (white lists);
  dynamic analysis—the analysis of a program for harmfulness on the basis of data obtained in the course of execution or emulation of the working of the program being analyzed, during which dynamic analysis may employ:
  heuristic analysis—emulation of the working of the program being analyzed, creating emulation logs (containing data on the API function calls, the parameters transmitted, the code sections of the program being analyzed, and so on), and searching for correspondences of the data from the logs created with data from a database of emulated signatures of malicious programs;
  proactive protection—intercepting of API function calls of a launched program being analyzed, creating of logs on the working of the program being analyzed (containing data on the API function calls, the parameters transmitted, the code sections of the program being analyzed, and so on), and searching for correspondences of the data from the logs created with data from a database of calls of malicious programs.

Both static and dynamic analysis have their advantages and disadvantages. For example, static analysis is less demanding on the resources of the computer system on which the analysis is being done, and since it does not require the execution or emulation of the program being analyzed, statistical analysis is faster, but less effective, i.e., it has a lower percentage of detection of malicious programs and a higher percentage of false alarms (i.e., judging a file being analyzed by the antivirus program as being harmful, whereas the file is safe). Dynamic analysis, because it uses data obtained during execution or emulation of the working of the program being analyzed, is slower and places greater demands on the resources of the computer system on which the analysis is being done, but it is also more effective. Modern antivirus programs employ complex analysis, including elements of both static and dynamic analysis.

Although the known techniques are good at detecting malicious files, as well as files constituting a potential threat in cases where said files contain data similar to data being used in already previously detected malicious files, they often have poor effectiveness in detecting of new malicious files using data not previously used in other malicious files, or which has been modified.

SUMMARY

The present disclosure enables a solving of the problem of detecting malicious files with the use of elements of statistical analysis.

According to an exemplary aspect, a method is provided for determining whether an electronic file is malicious. In this aspect, the method includes extracting a plurality of resources from the electronic file; forming at least one first rule that establishes a functional dependency between the plurality of extracted resources; identifying, in a database of malicious file resources, at least one second rule associated with at least one of the plurality of extracted resources; comparing the formed at least one first rule with the identified at least one second rule to calculate a degree of similarity between the formed at least one first rule and the identified at least one second rule; and determining the electronic file to be a malicious file when the calculated degree of similarity exceeds a predetermined threshold value.

According to another aspect, the method includes performing at least one of deleting the malicious file and quarantining the malicious file.

According to another aspect, the extracting of the plurality of resources from the electronic file comprises extracting at least one of data relating to a development environment used to create the electronic file, data relating to a software application that packed the electronic file, and a digital signature of the electronic file.

According to another aspect, the method includes computing a hash sum of the at least one of the plurality of extracted resources; and identifying, in the database of malicious file resources, the at least one second rule based on the computed hash sum.

According to another aspect, the method includes forming the at least one first rule by creating an artificial neural net of the plurality of extracted resources, wherein nodes of the created artificial neural net are analyses of the extracted resources, respectively, and links between the nodes indicate the functional dependency between the extracted resources.

According to another aspect, the method includes identifying, in the database of malicious file resources, the at least one second rule based on the functional dependency between the plurality of extracted resources.

According to another aspect, the method includes extracting the plurality of resources including an icon resource, a manifest resource and a dialog resource; forming a functional dependency between at least two of the icon, manifest and dialog resources; and searching, in the database of malicious file resources, for the at least one second rule based on the formed functional dependency between the at least two of the icon, manifest and dialog resources.

According to another aspect, the method includes calculating the degree of similarity between the formed at least one first rule and the identified at least one second rule based on pattern recognition with discriminant analysis between the functional dependency of the plurality of extracted resources of the formed at least one first rule and the least one of the plurality of extracted resources of the identified at least one second rule.

According to an exemplary aspect, a system is provided for determining whether an electronic file is malicious. In this aspect, the system includes at least one database that stores a plurality of rules associated with a plurality of malicious file resources; and at least one processor configured to: extract a plurality of resources from the electronic file; form at least one first rule that establishes a functional dependency between the plurality of extracted resources; identify, in the at least one database, at least one second rule of the plurality of stored rules, wherein the identified at least one second rule is associated with at least one of the plurality of extracted resources of the electronic file; compare the formed at least one first rule with the identified at least one second rule to calculate a degree of similarity between the formed at least one first rule and the identified at least one second rule; and determine the electronic file to be a malicious file when the calculated degree of similarity exceeds a predetermined threshold value.

According to another exemplary aspect, a non-transitory computer readable medium storing computer executable instructions is provided for determining whether an electronic file is malicious. In this aspect, instructions are included for extracting a plurality of resources from the electronic file; forming at least one first rule that establishes a functional dependency between the plurality of extracted resources; identifying, in a database of malicious file resources, at least one second rule associated with at least one of the plurality of extracted resources; comparing the formed at least one first rule with the identified at least one second rule to calculate a degree of similarity between the formed at least one first rule and the identified at least one second rule; and determining the electronic file to be a malicious file when the calculated degree of similarity exceeds a predetermined threshold value.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

The following disclosure introduces a number of definitions and concepts that will be used in the description of variant aspects of the present disclosure.

A "functional dependency" is a relation between two sets of attributes, wherein the attributes of one set can be obtained from the attributes of the second set by means of a transformation which is common to all attributes.

"Similarity of data" is a characteristic relating data to each other, describable by a numerical parameter, or "degree of similarity", which can be computed by the use of known metrics (such as the "Levenshtein" distance) to determine how similar data are to each other (preferably, its value generally being in the range of 0 to 1, where 0 indicates that the data are totally identical, and 1 means the data are totally different).

Figure 1:
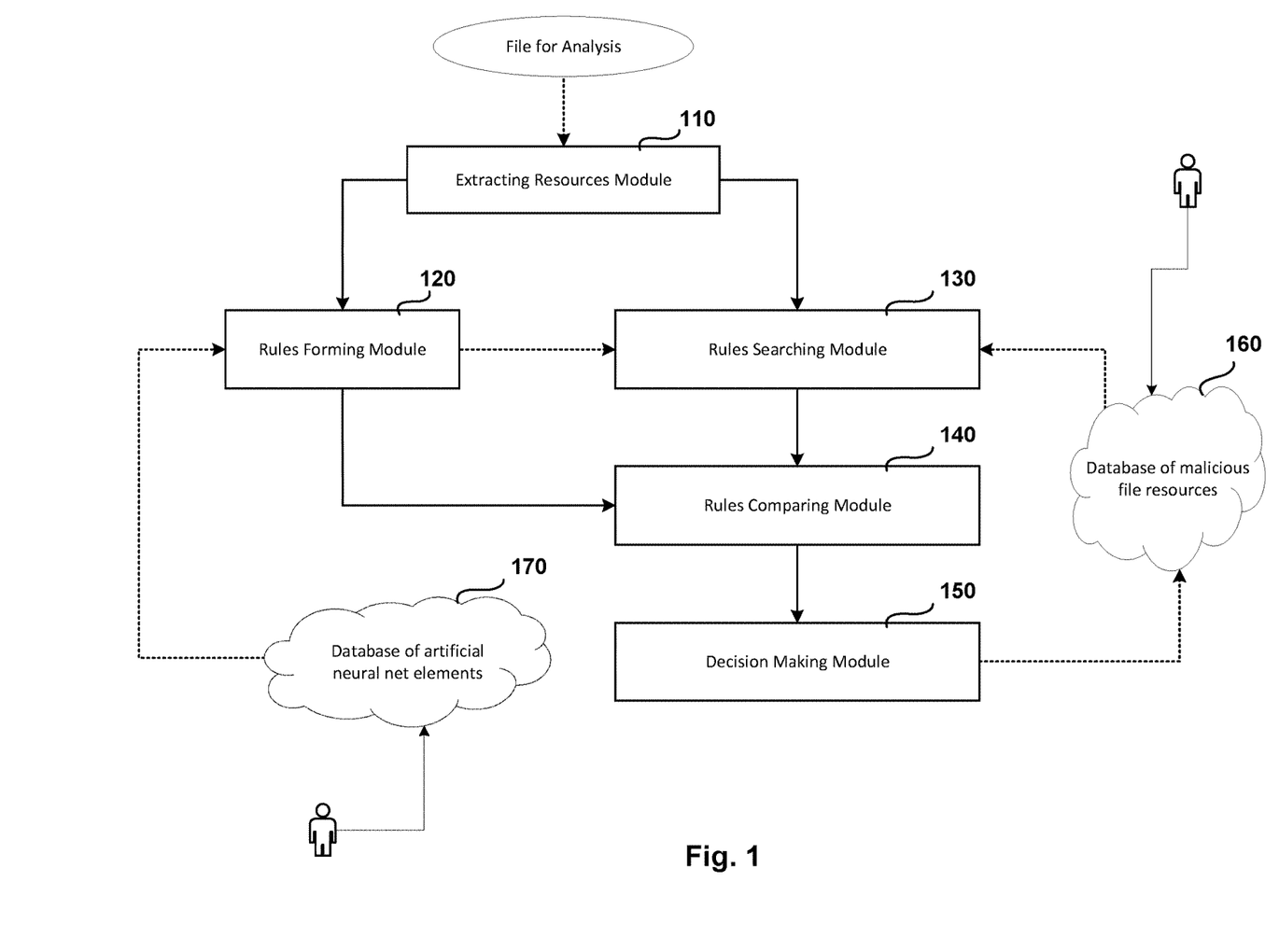
FIG. 1 illustrates a block diagram of a system for detection of malicious files with the use of elements of static analysis according to an exemplary aspect.

FIG. 1 illustrates a block diagram of the system for detection of malicious files with the use of elements of static analysis according to an exemplary aspect.

As shown, the structural diagram of the system for detection of malicious files with the use of elements of static analysis can include a plurality of modules including a module configured for extracting resources 110 (i.e., an "extracting resources module"), a module configured for forming rules 120 (i.e., a "rules forming module"), a module configured for searching for rules 130 (i.e., a "a rules searching module"), a module configured for comparing rules 140 (i.e., a "rules comparing module"), a module configured for decision making 150 (i.e., a "decision making module") and a database of resources of malicious files 160.

As used herein, the term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

According to the exemplary aspect, the module configured for extracting resources 110 is designed to extract resources from a file being analyzed; and send the extracted resources to the module configured for forming rules 120 and the module configured for searching for rules 130.

In one variant aspect of the system, the file being analyzed is at least an executable file and a file containing scripts.

For example, executable files may be files .exe (explorer.exe), .dll (OCHelper.dll), sys (mountmgr.sys).

In yet another example, files containing scripts may be any files whose data execute third-party executable files (scripts in ActionScript language, executable by the stack virtual machine Adobe Flash, called up by Internet Explorer, Microsoft Excel macros, and executable upon executing a script in the language Visual Basic for Applications, and so on).

In yet another variant aspect of the system, files containing scripts are at least the files: Microsoft Office (.doc, .docx, ppt, pptx, .xls, .xlsx and so on); Adobe Acrobat Reader (.pdf); Adobe Flash Player (.swf); containing scripts written in PowerShell language.

In yet another variant aspect of the system, the resources of a file being analyzed are at least: the resources contained in the resources section of the file being analyzed; the data contained in the file being analyzed and describing the development environment which was used to create (compile) that file; the data contained in the file being analyzed and describing the software used to pack that file; and/or the data corresponding to the digital signature of the file being analyzed.

For example, the resources contained in the resources section of an executable file being analyzed with the extension ".exe" may be cursors (RT_CURSOR), icons (RT_ICON), dialog windows (RT_DIALOG), menus (RT_MENU), strings (RT_STRING), bit maps (RT_BITMAP) and so on, structured in the form of a tree and stored in the section ".rsrc" of the file being analyzed. All of the information about the resource constituting the meta-data of the resource (such as, for icons, the dimensions of the icon, the number of bits per color in the icon, the type of icon, the pointer of the bit map; for dialogs, the dimension of the dialog, the parameters of the basic font of the dialog, the number of elements contained in the dialog, and so on) may be contained directly in the resource itself.

In yet another example, the data describing the development environment which was used to create the file being analyzed (for example, to compile the source code in the executable file) may be: the name of the development environment, the version of the development environment, the date of creation (or compiling) of the file being analyzed; (such as Microsoft Visual Studio 2015). The aforementioned data describing the development environment might not be contained in explicit form in the file being analyzed, but rather obtained by analysis of the structure of the file being analyzed with the use of signatures typical of a given development environment, and the signatures might be the calls of functions and/or the execution codes.

In yet another example, the data describing the software for the packing of the file being analyzed might be the name of the packer program, the version of the packer program, the data of packing of the file being analyzed; (such as UPX 3.94). The aforementioned data describing the packing software might not be contained in explicit form in the file being analyzed, but rather obtained by analysis of the executable code located at the entry point of the executable file being analyzed (for example, since each packing software will create in the file being packed a unique unpacking code, if we know its characteristics, that is, the API functions being used, the sequence of calling for operators, and so forth, it is also possible to determine the actual packing software, and the aforementioned characteristics of the unpacking code may be specified by signatures and bit masks).

In yet another example, the data corresponding to the digital signature of a file being analyzed might be: the name of the organization issuing the digital signature, and/or the validity (authenticity) of that digital signature.

In yet another variant aspect of the system, the module configured for extracting resources 110 extracts resources on the basis of at least: data on the structure of the resources contained in the file being analyzed; and/or signatures containing meta-data of the resources being extracted.

For example, in an executable file with the extension ".exe", data on the structure of the resources is contained in the header of that file and in the header of the resources section ".rsrc", constituting a tree, at the nodes of which are found either the resources themselves directly or data about the resources.

In yet another variant aspect of the system, the module configured for extracting resources 110 additionally computes on the basis of each resource extracted the hash sum of that resource and sends the computed hash sums to the module configured for searching for rules 130.

For example, the hash sum might be: the MD5 sum (or simply MD5) for images, media data, or nonstructured resources; and/or convolutions based on lexemes for dialogs, strings, menus and other resources containing lexical data.

In yet another example, the hash sum might be a perceptual hashing, identical for similar data.

In an exemplary aspect, the module configured for forming rules 120 is designed to form at least one rule establishing a functional dependency between the resources obtained (hereinafter, a rule), where the rule is formed by creating from the obtained resources an artificial neural net, where the nodes of the artificial neural net are modules for performing analysis of the obtained resources, and the links between the nodes which are formed during the creation of the neural net indicate the functional dependency between the obtained resources; and send each rule formed to the module configured for comparing rules 140.

In one variant aspect of the system, the module configured for forming rules 120 additionally forms rules from the totality of functional dependencies previously established by a third party (such as virus analysts or automatic antivirus application(s) of antivirus companies) between the resources of files processed by said third party, where the resources extracted by the module configured for extracting resources 110 are similar to the resources used to form said previously established functional dependencies.

For example, the virus analysts or automatic analysis application(s) (used in the context of cloud services, such as Kaspersky Security Network) have previously established on the basis of an analysis of a large quantity of malicious files typical links between the resources of malicious files: the main application icon (RC_ICON) is similar to, but not congruent with (i.e., the degree of similarity tends toward 0, but is not equal to 0) the icons of secure applications (such as Internet Explorer or Windows Media Player); there is only one dialog (RC_DIALOG) and it is the dialog of the main window; and the like.

The module configured for forming rules 120 uses these links to establish functional dependencies between the resources extracted from the file being analyzed by the module configured for extracting resources 110.

In yet another variant aspect of the system, the module configured for analysis of resources is a node of a created artificial neural net, designed to create, with the use of predetermined algorithms based on the obtained resources, data describing the functional link between the aforesaid resources.

In yet another variant aspect of the system, the result of the working of the module configured for analysis of resources on the basis of the obtained resources constitutes a convolution of the resource.

In yet another variant aspect of the system, the resources analysis module is data describing the algorithm for the processing of the resources, and the execution of this algorithm is done directly by the module configured for forming rules 120.

For example, the resources analysis module may be data describing inverse affine transformations, transforming an image into a set of affinors.

In yet another example, the resources analysis module may be data describing an algorithm for picking out lexemes from text and composing text convolutions from the lexemes picked out.

In yet another variant aspect of the system, the resources analysis module is provided for performing a cluster analysis, wherein the cluster is a group of resources unified at least by: the application of those resources in the file being analyzed; a predetermined range of parameters describing those resources; a predetermined range of frequency characteristics for the distribution of lexemes contained in said resources; and/or a pattern recognition.

For example, the resources analysis module may be an algorithm for making a comparison of an image (being the resource obtained) with predetermined images (contained in the module) and computing the degree of similarity between the mentioned images (for example, establishing a functional link of "similar/not similar").

In yet another variant aspect of the system, the artificial neural net is chosen on the basis of the resources obtained from the module configured for extracting resources 110, from a database of elements of an artificial neural net 170, where the nodes and links of the obtained artificial neural net will be predetermined (for example, by virus analysts or automatic antivirus application(s) of the antivirus companies). After selecting the aforementioned artificial neural net, the module configured for forming rules 120 performs a training of this on the basis of the resources obtained from the module configured for extracting resources 110.

In yet another variant aspect of the system, the module configured for forming rules 120 creates an artificial neural net by using at least the methods of a perceptron, wherein the S-elements are the resources, the A- and R-elements are the means of analysis of the resources, and the links between these elements are arranged on the basis of meta-data of the aforementioned resources, and/or a convolutional neural network (CNN), where the nodes of the neural net are the resources and the convolutions of the resources, and the links are the resources analysis module performing the convolutions of said resources.

In yet another variant aspect of the system, the module configured for forming rules 120 form the links between the nodes of the created artificial neural net on the basis of machine learning algorithms.

In yet another variant aspect of the system, the machine learning method used by the module configured for forming rules 120 to form the links between nodes of the created artificial neural net, the module configured for forming rules 120 uses supervised learning, where the role of the teacher is played by a third party (for example, virus analysts or automatic antivirus software application(s) of the antivirus companies), while the correcting of errors is done by said third party beforehand on the basis of files which have been analyzed during the forming of the database of resources of malicious files 160 by said third party.

In yet another variant aspect of the system, the machine learning method used by the module configured for forming rules 120 to form the links between the nodes of the created artificial neural net, the module configured for forming rules 120 uses unsupervised learning, where the method of backward propagation of errors is used to teach the artificial neural net.

In yet another variant aspect of the system, the module configured for forming rules 120 additionally sends to the module configured for searching for rules 130 information about the resources between which a functional dependency has been established, and the module configured for searching for rules 130 performs the search for rules in the database of resources of malicious files 160 only for those resources about which said information was obtained.

The module configured for searching for rules 130 is designed to perform a search for at least one rule in the database of resources of malicious files 160 on the basis of the resources obtained from the module configured for extracting resources 110; and send each rule found to the module configured for comparing rules 140.

In yet another variant aspect of the system, the module configured for searching for rules 130 additionally performs a search for at least one rule in the database of resources of malicious files 160 on the basis of the obtained hash sums of resources.

For example, to each resource in the database of resources of malicious files 160 there corresponds an MD5 of that resource. In this case, for the resources which are to be searched for the module configured for searching for rules 130 computes MD5 beforehand, and then it performs the searching for rules based on the computed MD5 in database of resources of malicious files 160 (for example, by the binary search method).

In yet another variant aspect of the system, the module configured for searching for rules 130 during the searching for rules in the database of resources of malicious files 160 finds rules based on the determination of the degree of similarity of the resources obtained from the module configured for extracting resources 110 and the resources on the basis of which the rules have been formed which are contained in the database of resources of malicious files 160.

For example, in the case when a search is carried out on the basis of an image (being one of the extracted resources) for images in the database of resources of malicious files, the module configured for searching for rules 130 performs the following actions: from the image obtained from the file being analyzed, the YUV components are formed (the YUV components constitute data describing the mentioned image in a color model expressing the color of points making up that image in terms of brightness Y and two chromas U and V); for each component formed, the frequency distribution of color shades is computed from darkest (0) to lightest (255), thus forming a 256-metric vector, constituting a data array (row data); the vectors formed are compared with other 256-metric vectors from the database of resources of malicious files 160, likewise constituting data arrays used as potential keys (candidate key, hereinafter keys) (i.e., data used to perform a search for other data entered into the database of resources of malicious files 160), computing for this purpose the scalar product of the formed vector and the key (the angle between the vectors is computed); and if the value of the computed scalar product is less than a predetermined value, the images on the basis of which said vectors were formed are considered to be similar.

In yet another variant aspect of the system, the module configured for searching for rules 130 computes the degree of similarity of the resources obtained from the module configured for extracting resources 110 to resources used as the basis in forming the rules contained in the database of resources of malicious files 160, making use of pattern recognition methods with the use of discriminant function analysis.

In yet another variant aspect of the system, the module configured for searching for rules 130 makes a search for rules in the database of resources of malicious files 160 based on the resources which were used to formulate the rules contained in the database of resources of malicious files 160 of only the same type as the resources obtained from the module configured for extracting resources 110.

For example, based on the icons in the database of resources of malicious files 160, the module configured for searching for rules 130 finds rules for which the icons were used to form them. For example, based on the Internet Explorer icon, a rule is found in the database of resources of malicious files 160 which relates the MD5 of the Internet Explorer icon to the manifest (RT_MANIFECT) created by Microsoft.

In yet another variant aspect of the system, the module configured for searching for rules 130 additionally makes a search for rules in the database of resources of malicious files 160 on the basis of only those resources obtained from the module configured for extracting resources 110 between which the module configured for forming rules 120 has established a functional dependency.

For example, from the file "explorer.ex" the module configured for extracting resources 110 extracted the icons "icon1.ico", "icon2.ico", the manifest "manifest.txt" and the main window dialog "DIALOG_1". The module configured for forming rules 120 established a functional dependency between the icon "icon1.ico" and the dialog "DIALOG_1" (the icon "icon1.ico" is depicted on a button from the dialog "DIALOG_1"). To search for rules in the database of resources of malicious files 160, the module configured for searching for rules 130 uses, as keys, only the icon "icon1.ico" and the dialog "DIALOG_1", while the icon "icon2.ico" and the manifest "manifect" are ignored.

The module configured for comparing rules 140 is designed to compute the degree of similarity between the rules obtained from the module configured for forming rules 120 and the module configured for searching 130; and send the computed degree of similarity to the module configured for making a decision 150.

In one variant aspect of the system, the degree of similarity is a numerical value from 0 (the rules are identical) to 1 (the rules are different).

For example, two rules containing 5 components apiece, 4 of which are identical in one rule and 4 in the second rule, while the remaining 2 components are different, have a degree of similarity of 0.2.

In yet another variant aspect of the system, the module configured for comparing rules 140 computes the degree of similarity between rules using pattern recognition methods with the use of discriminant analysis.

In yet another variant aspect of the system, in the case when at least two rules have been obtained from the module configured for forming rules 120 or the module configured for searching for rules 130, the module configured for comparing rules 140 is further configured to compute degrees of similarity for at least two pairs of rules, each of which includes one rule obtained from the module configured for forming rules 120, and one rule obtained from the module configured for searching 130, while at least two pairs of rules include different rules from the module configured for forming rules 120 or the module configured for searching for rules 130; and compute the summed degree of similarity as a measure of the central tendency of the previously computed degrees of similarity; and/or a fuzzy hash of the previously computed degrees of similarity.

For example, the module configured for forming rules 120 has formulated on the basis of the resources resource #1, resource #2, resource #3 the rules $r_1$, $r_2$, while the module configured for searching for rules 130 has found a rule $m_1$. The module configured for comparing rules 140 computes the degrees of similarity:

$$r_1 \rightarrow m_1 = 0.251$$

$$r_2 \rightarrow m_1 = 0.374$$

and the summed degree of similarity as the arithmetic mean of the previously computed degrees of similarity:

$$\{r_i\} \rightarrow m_1 = 0.3125$$

The module configured for making a decision 150 is designed to judge a file being analyzed as malicious if the obtained degree of similarity exceeds a predetermined threshold value.

In one variant aspect of the system, the threshold value of the degree of similarity is established beforehand by a third party (such as the virus analysts or automatic antivirus software applications(s) of antivirus companies) on the basis of a statistical analysis of rules contained in the database of resources of malicious files 160, such that the decision as to harmfulness made by the module configured for making a decision 150 of secure files analyzed by the third party would be negative, and that for malicious files would be affirmative.

For example, when creating the database of resources of malicious files 160, a virus analyst with the help of one or more automatic software application(s) has analyzed 1000 files, of which 659 proved to be malicious, while the remaining 341 were safe. Based on the resources of the malicious files analyzed, rules were formulated and then entered into the database of resources of malicious files 160. After this, for each of the 1000 files analyzed, the degree of similarity of the rules formulated on the basis of the resources of the files analyzed and the rules contained in the created database of resources of malicious files 160 was computed. On the basis of the computed degrees of similarity, a threshold value was established for the degrees of similarity according to the formula:

$$s_{limit} = \text{ave}(\min(\{s_{clean}\}), \max(\{s_{malware}\}))$$

where:
$s_{limit}$ is the threshold value of the degree of similarity,
$s_{clean}$ is the degree of similarity for a safe file,
$s_{malware}$ is the degree of similarity for a malicious file.

In yet another variant aspect of the system, the module configured for making a decision 150 additionally enters at least one rule into the database of resources of malicious files 160, as formed by the module configured for forming rules 120, in the event that the module configured for making a decision 150 judges the file being analyzed to be malicious.

For example, on the basis of the resources $\{d_i\}$ extracted by the module configured for extracting resources 110 from the file being analyzed "video.avi.exe", the module configured for forming rules 120 has formulated the rules $\{r_i\}$, on the basis of which the module configured for making a decision 150 has judged the file being analyzed to be malicious. The module configured for making a decision 150 enters in the database of resources of malicious files 160 the rules $\{r_i\}$, using as keys the resources $\{d_i\}$.

The database of resources of malicious files 160 is a database containing at least two rules, each of which establishes a functional dependency between resources of at least one and the same malicious file.

In one variant aspect of the system, the database of resources of malicious files 160 is provided by an antivirus company (server) on the computing device (client) on which the analysis of files is done.

In yet another variant aspect of the system, each rule stored in the database of resources of malicious files 160 corresponds to at least one key, by which the module configured for searching for rules 130 performs the search for rules, using as the key at least one of the resource used to form the mentioned rule; and the hash sum of the resource used to form the mentioned rule.

In yet another variant aspect of the system, the rules establishing a functional link between resources of one and the same malicious file are formulated and entered in the database of resources of malicious files 160 beforehand by a third party (such as the virus analysts or automatic antivirus software applications(s) of antivirus companies) and only then is the database of resources of malicious files 160 containing the mentioned rules provided to the system for detection of malicious files with the use of elements of static analysis.

In yet another variant aspect of the system, the database of resources of malicious files 160 is additionally designed to enter by the module configured for making a decision 150 the rules formulated by the module configured for forming rules 120.

The database of elements of an artificial neural net 170 is a database containing at least one previously created (for example, by the virus analysts or automatic antivirus software applications(s) of antivirus companies on the basis of analyzed malicious files), said artificial neural net constituting an assemblage of the resources analysis module which are nodes of the artificial neural net and weighting factors characterizing the links between the nodes of the artificial neural net.

In one variant aspect of the system, the database of elements of an artificial neural net 170 is provided by an antivirus company (server) on the computing device (client) on which the analysis of files is done.

In yet another variant aspect of the system, the artificial neural net constitutes data describing analysis algorithms $\{A_i\}$ of the resources $\{d_i\}$ and weighting factors $\{w_i\}$ characterizing the links between $\{A_i\}$, i.e.

$$\sum_{j}^{n} w_{ij} \times A_i(d_j) \to r_i$$

where
n is the number of resources extracted by the module configured for extracting resources 110,
m is the number of analysis algorithms $\{A_i\}$ of resources,
$r_i$ is the i-th functional dependency between the set of all resources $\{d_j\}$, as formulated by the analysis algorithms $\{A_i\}$, while for each separate resource $d_j$ an individual weighting factor $w_{ij}$ is used, which is modified during the teaching of the artificial computer network.

For example, if the system for detection of malicious files is working with the use of elements of static analysis by the example of determining the harmfulness of a file "movie.avi.exe", being an application with a graphic interface imitating the graphic interface of the application "Internet Explorer", the system can operate as follows.

In one aspect, the module configured for extracting resources 110 extracts the following resources from the file being analyzed "movie.avi.exe": from the resources section ".rsrc" of Windows resources: the main icon of the application "main.ico" (RC_ICON), the manifest "manifest.txt" (RC_MANIFEST), the main window dialog "DIALOG_Main" (RC_DIALOG), the main window menu "MENU_Main" (RC_MENU); from the code section ".text" data about the development environment used to create the file "movie.avi.exe": the name and version of the development environment "Embarcadero Delphi 10.2"; from the data section ".data" data on the packing software of the file "movie.avi.exe": the name and version of the packing software "ASProtect 32 (SKE) 2.70".

The module configured for forming rules 120, using the resources obtained from the module configured for extracting resources 110, teaches the artificial neural net selected from the database of elements of an artificial neural net 170. For this purpose, the module configured for forming rules 120 with the aid of cluster analysis selects the resources possessing similar properties or similar relationships (for example, certain icons are similar to other icons and thereby form a single cluster, certain icons are used in dialogs and form another cluster), and uses the selected resources as input parameters for the artificial neural net to form the links, for which supervised teaching is used, on the basis of links previously formed by virus analysts on files similar in behavior to the file "movie.avi.exe". After the created artificial neural net has been "taught", i.e., links have been formed between the nodes of said artificial neural net (weighting factors between elements of the neural net have been calculated), the module configured for forming rules 120 on the basis of the links formed forms rules establishing functional dependencies between the resources extracted by the module configured for extracting resources 110:

$r_1$: main.ico→manifest.txt ("Internet Explorer")

$r_2$: "Embarcadero Delphi"→manifest.txt ("Internet Explorer")

$r_3$: "ASProtect 32 (SKE) 2.70"→main.ico $r_4$: DIALOG_Main→MENU_Main

In other words, the icon "main.ico" belongs to the application named "Internet Explorer", written in language "Delphi" and packed with the aid of the application "ASProtect". Moreover, the main window dialog "DIALOG_Main" is linked to the main window menu "MENU_Main".

The link DIALOG_Main→MENU_Main is considered to be trivial (since according to the rules of creating applications, regardless of whether a file is safe or malicious, or which resources it contains, and so on, the main window dialog is always linked to the main window menu), and so there will be no search for the mentioned resources in the database of resources of malicious files 160.

In this example, the module configured for searching for rules 130 computes perceptual hash sums for the resources: main.ico, manifest.txt, "Embarcadero Delphi", "ASProtect 32 (SKE) 2.70"; extracted from the file "movie.avi.exe" by the module configured for extracting resources 110, except for the resources: DIALOG_Main and MENU_Main; and performs a search based on the computed perceptual hash sums for rules in the database of resources of malicious files 160. Since in the search for rules the module configured for searching for rules 130 uses the perceptual hash sums from the extracted resources of the file "movie.avi.exe", rules will be found which establish a functional dependency between the resources of a malicious file which are similar (but not necessarily identical) to the resources extracted from the file "movie.avi.exe".

As a result of the search performed, the module configured for searching for rules 130 selects from the database of resources of malicious files 160 the rule $m_1$, establishing the functional dependency:

app_main.ico→app_manifest.info ("Internet Explorer")

"Embarcadero Delphi"→app_manifest.info ("Internet Explorer")

and sends this to the module configured for comparing rules 140.

The module configured for comparing rules 140 computes the degree of similarity between the rules $\{r_i\}$ formulated by the module configured for forming rules 120 and the rule $m_1$ obtained from the module configured for searching for rules 130:

$s_1(r_1 \to m_1) = 0.021,$ $s_2(r_2 \to m_1) = 0.178,$ $s_3(r_3 \to m_1) = 0.105,$ no computation being done for the degree of similarity $r_4 \to m_1$, since the resources between which the module configured for forming rules 120 has determined a functional dependency (DIALOG_Main, MENU_Main) were not used by the module configured for searching for resources 130 to search for rules in the database of resources of malicious files 160. The module configured for comparing rules 140 then computes the summed degree of similarity as the geometrical mean of the previously computed degrees of similarity:

$$s_{total} = \left(\prod_{i=1}^{3} s_i\right)^{\frac{1}{3}} \cong 0.073$$

and sends the obtained value of the degree of similarity to the module configured for making a decision 150.

The module configured for making a decision 150 compares the obtained value of the degree of similarity of 0.073 to the predetermined threshold value of 0.203. Since the obtained degree of similarity does not exceed the predetermined threshold value, the module configured for making a decision 150 pronounces a decision as to the harmfulness of the analyzed file "movie.avi.exe".

Thus, the file "movie.avi.exe" is judged to be malicious, after which the antivirus program which includes the system of detection of malicious files with the use of elements of static analysis will at least inform the user that a malicious file has been detected on the computer system, block the execution of the file "movie.avi.exe", isolate (i.e., quarantine) or remove the file "movie.avi.exe" from the computer system.

Figure 2:
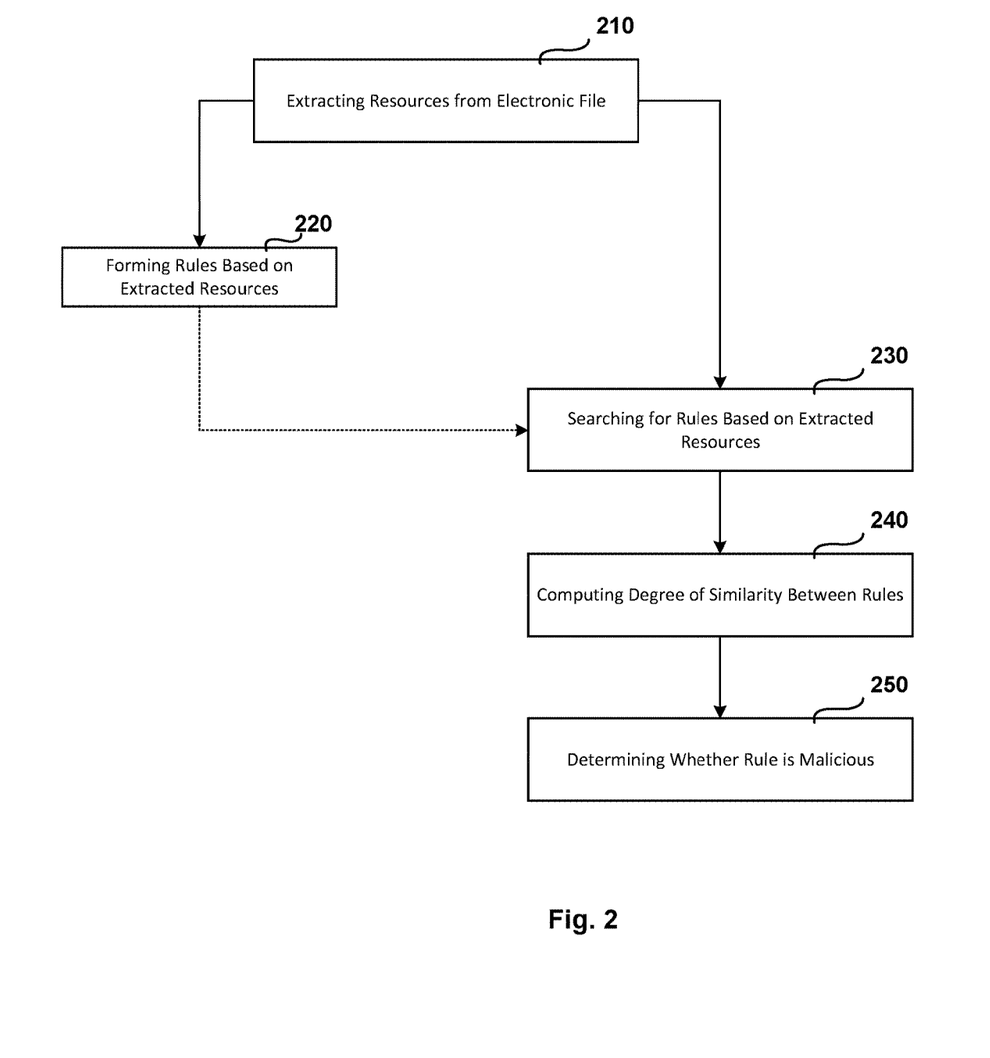
FIG. 2 illustrates a flowchart for a method of detection of malicious files with the use of elements of static analysis according to an exemplary aspect.

FIG. 2 illustrates a flowchart for a method of detection of malicious files with the use of elements of static analysis according to an exemplary aspect.

As shown, the flowchart of FIG. 2 provides a method of detection of malicious files with the use of elements of static analysis including a step in which resources are extracted from a file being analyzed 210, a step in which rules 220 are formed, a step in which a search is made for rules 230, a step in which the degree of similarity between rules 240 is computed and a step in which a decision is made as to the harmfulness of the file being analyzed 250.

For example, in step 210, the module configured for extracting resources 110 is used to extract resources from the file being analyzed as described above. Moreover, in step 220, the module configured for forming rules 120 is used to form at least one rule establishing a functional dependency between the extracted resources (hereinafter, a rule) for example, by creating from the extracted resources an artificial neural net, where the extracted resources are the nodes of the artificial neural net, and the links between these nodes that are formulated during the creating of said neural net indicate the functional dependency between the extracted resources.

In addition, in step 230, the module configured for searching for rules 130 is used to perform a search during which it finds at least one rule in the database of resources of malicious files 160 on the basis of the resources extracted during step 210 as further described above. Next, in step 240, the module configured for comparing rules 140 is used to compute the degree of similarity between the rules formulated in step 220 and found in step 230 as also described above. Finally, in step 250, the module configured for making a decision 150 is used to judge the file being analyzed as malicious if the computed degree of similarity exceeds a predetermined threshold value. If the file being analyzed is determined to be malicious, the system can be configured to delete the file, quarantine the file and/or perform some other remedial action, such as alerting the user, according to known techniques.

Figure 3:
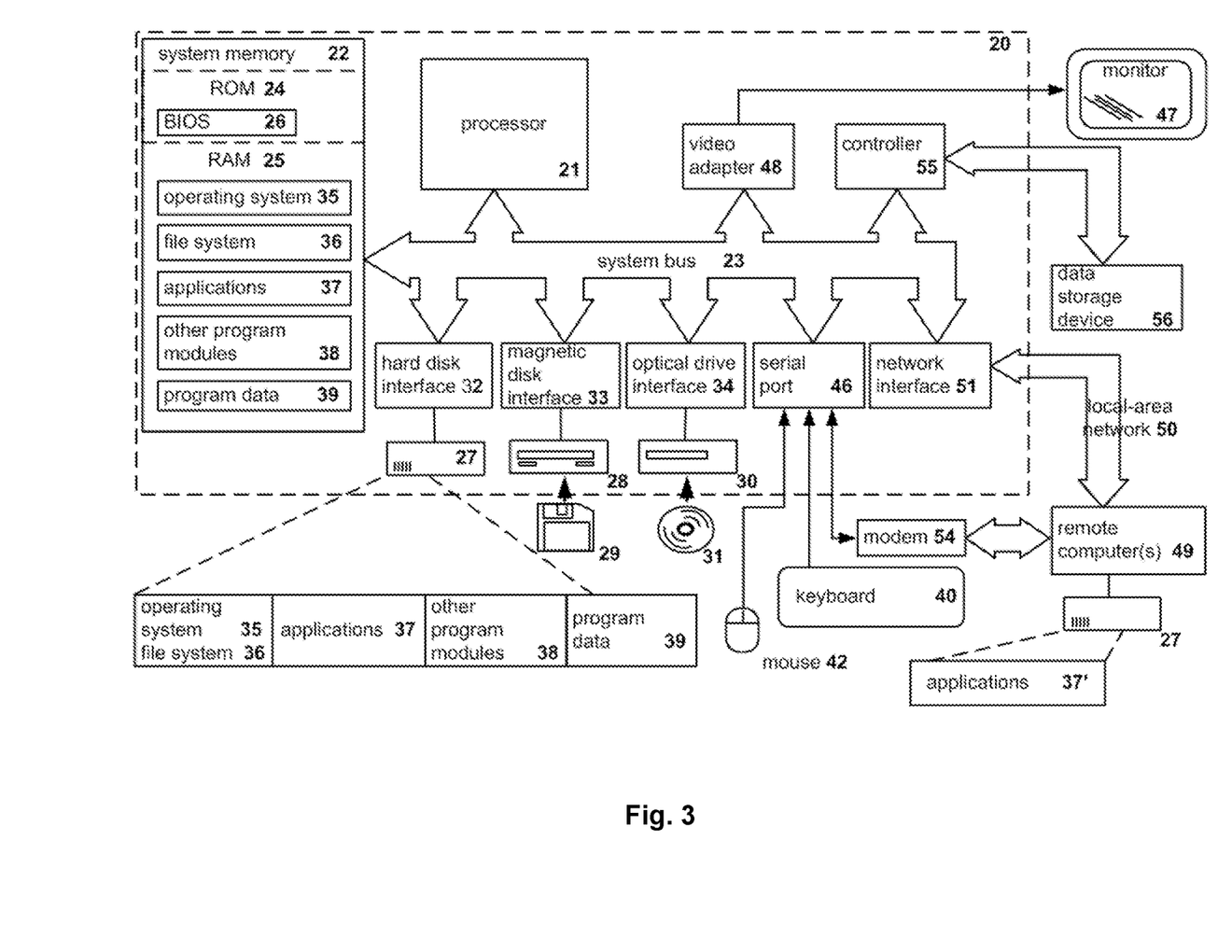
FIG. 3 illustrates an example of a general-purpose computer system (which may be a personal computer or a server) on which the disclosed systems and method can be implemented according to an example aspect.

FIG. 3 illustrates an example of a general-purpose computer system (which may be a personal computer or a server) on which the disclosed systems and method can be implemented according to an example aspect. As shown, the computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for determining whether an electronic file is malicious, the method comprising:
   extracting a plurality of resources from the electronic file;
   forming at least one first rule that establishes a functional dependency between the plurality of extracted resources using an artificial neural net where the extracted resources are nodes of the artificial neural net;

identifying, in a database of malicious file resources, at least one second rule associated with at least one of the plurality of extracted resources;

comparing the formed at least one first rule with the identified at least one second rule by calculating a degree of similarity between the formed at least one first rule and the identified at least one second rule; and determining the electronic file to be a malicious file when the calculated degree of similarity exceeds a predetermined threshold value.

2. The method according to claim 1, further comprising performing at least one of deleting the malicious file and quarantining the malicious file.

3. The method according to claim 1, wherein the extracting of the plurality of resources from the electronic file comprises extracting at least one of data relating to a development environment used to create the electronic file, data relating to a software application that packed the electronic file, and a digital signature of the electronic file.

4. The method according to claim 1, further comprising:
computing a hash sum of the at least one of the plurality of extracted resources; and
identifying, in the database of malicious file resources, the at least one second rule based on the computed hash sum.

5. The method according to claim 1, wherein the forming of the at least one first rule comprises: creating the artificial neural net of the plurality of extracted resources, wherein the nodes of the created artificial neural net represent analyses of the extracted resources and links between the nodes indicate the functional dependency between the extracted resources.

6. The method according to claim 1, further comprising identifying, in the database of malicious file resources, the at least one second rule based on the functional dependency between the plurality of extracted resources.

7. The method according to claim 6, further comprising:
extracting the plurality of resources including an icon resource, a manifest resource and a dialog resource;
forming a functional dependency between at least two of the icon, manifest and dialog resources; and
searching, in the database of malicious file resources, for the at least one second rule based on the formed functional dependency between the at least two of the icon, manifest and dialog resources.

8. The method according to claim 1, further comprising calculating the degree of similarity between the formed at least one first rule and the identified at least one second rule based on pattern recognition with discriminant analysis between the functional dependency of the plurality of extracted resources of the formed at least one first rule and the least one of the plurality of extracted resources of the identified at least one second rule.

9. A system for determining whether an electronic file is malicious, the system comprising:
at least one database that stores a plurality of rules associated with a plurality of malicious file resources; and
at least one processor configured to:
extract a plurality of resources from the electronic file;
form at least one first rule that establishes a functional dependency between the plurality of extracted using an artificial neural net where the extracted resources are nodes of the artificial neural net;
identify, in the at least one database, at least one second rule of the plurality of stored rules, wherein the identified at least one second rule is associated with at least one of the plurality of extracted resources of the electronic file;
compare the formed at least one first rule with the identified at least one second rule by calculating a degree of similarity between the formed at least one first rule and the identified at least one second rule; and
determine the electronic file to be a malicious file when the calculated degree of similarity exceeds a predetermined threshold value.

10. The system according to claim 9, wherein the at least one processor is further configured to delete the malicious file and quarantine the malicious file.

11. The system according to claim 9, wherein the at least one processor is further configured to extract the plurality of resources from the electronic file by extracting at least one of data relating to a development environment used to create the electronic file, data relating to a software application that packed the electronic file, and a digital signature of the electronic file.

12. The system according to claim 9, wherein the at least one processor is further configured to compute a hash sum of the at least one of the plurality of extracted resources, and identify, in the at least one database of malicious file resources, the at least one second rule based on the computed hash sum.

13. The system according to claim 9, wherein the at least one processor is configured to form the at least one first rule by creating the artificial neural net of the plurality of extracted resources, wherein the nodes of the created artificial neural net represent analyses of the extracted resources and links between the nodes indicate the functional dependency between the extracted resources.

14. The system according to claim 9, wherein the at least one processor is further configured to identify, in the at least one database of malicious file resources, the at least one second rule based on the functional dependency between the plurality of extracted resources.

15. The system according to claim 14, wherein the at least one processor is further configured to:
extract the plurality of resources including an icon resource, a manifest resource and a dialog resource;
form a functional dependency between at least two of the icon, manifest and dialog resources; and
search, in the at least one database of malicious file resources, for the at least one second rule based on the formed functional dependency between the at least two of the icon, manifest and dialog resources.

16. The system according to claim 9, wherein the at least one processor is further configured to calculate the degree of similarity between the formed at least one first rule and the identified at least one second rule based on pattern recognition with discriminant analysis between the functional dependency of the plurality of extracted resources of the formed at least one first rule and the least one of the plurality of extracted resources of the identified at least one second rule.

17. A non-transitory computer readable medium storing computer executable instructions for determining whether an electronic file is malicious, including instructions for:
extracting a plurality of resources from the electronic file;
forming at least one first rule that establishes a functional dependency between the plurality of extracted resources using an artificial neural net where the extracted resources are nodes of the artificial neural net;

identifying, in a database of malicious file resources, at least one second rule associated with at least one of the plurality of extracted resources;

comparing the formed at least one first rule with the identified at least one second rule by calculating a degree of similarity between the formed at least one first rule and the identified at least one second rule; and determining the electronic file to be a malicious file when the calculated degree of similarity exceeds a predetermined threshold value.

18. The non-transitory computer readable medium of claim 17, further including instructions for performing at least one of deleting the malicious file and quarantining the malicious file.

19. The non-transitory computer readable medium of claim 17, wherein the extracting of the plurality of resources from the electronic file comprises extracting at least one of data relating to a development environment used to create the electronic file, data relating to a software application that packed the electronic file, and a digital signature of the electronic file.

20. The non-transitory computer readable medium of claim 17, the instruction for forming the at least one first rule further including instructions for: creating the artificial neural net of the plurality of extracted resources, wherein the nodes of the created artificial neural net represent analyses of the extracted resources and links between the nodes indicate the functional dependency between the extracted resources.

* * * * *